Oct. 22, 1929.   R. W. SNYDER   1,732,778
MACHINE FOR SHAPING TIRES AND INSERTING AIRBAGS THEREIN
Filed Dec. 15, 1927
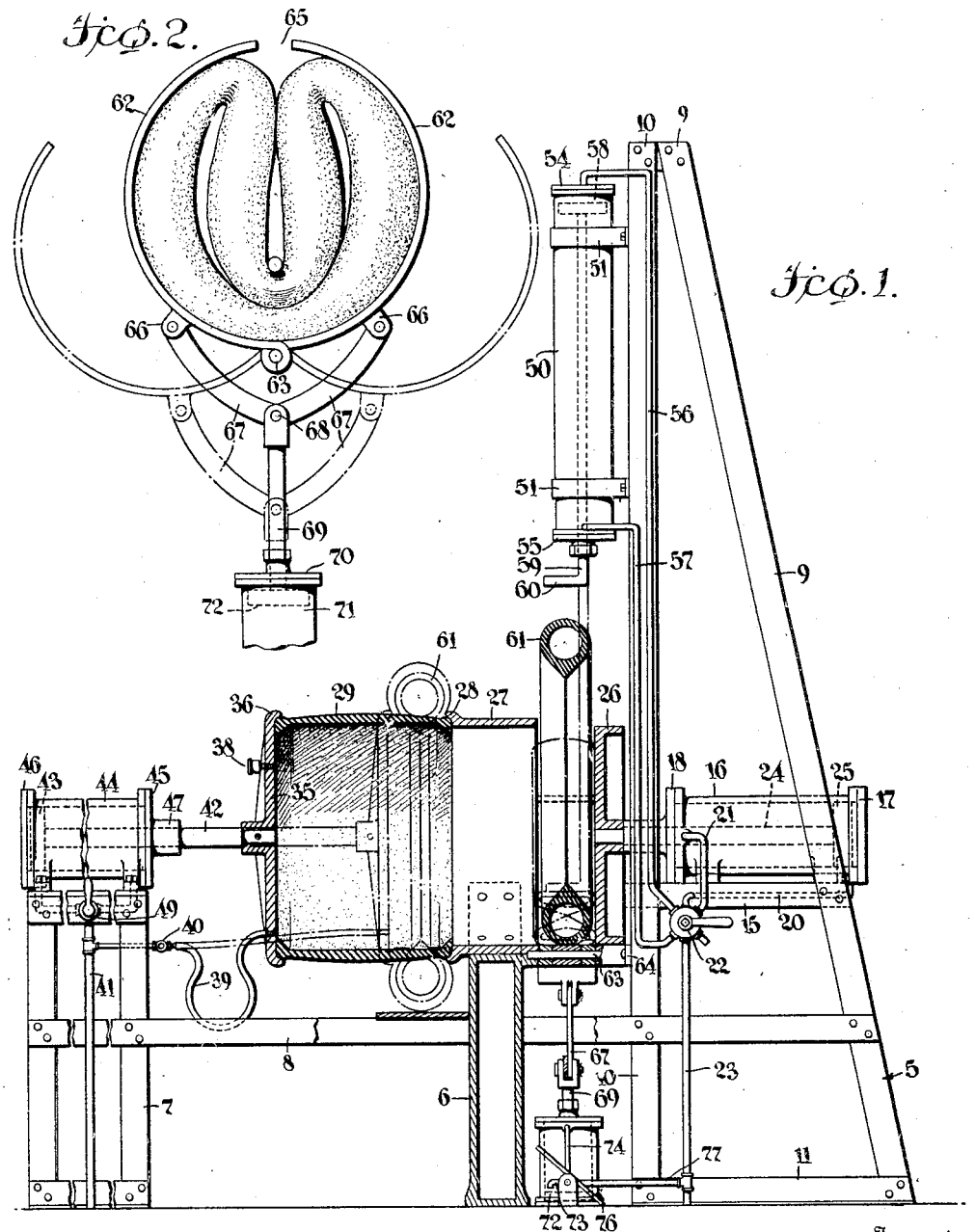
Inventor
Robert W. Snyder, Patented Oct. 22, 1929

1,732,778

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

MACHINE FOR SHAPING TIRES AND INSERTING AIR BAGS THEREIN

Application filed December 15, 1927. Serial No. 240,170.

My invention relates to apparatus for shaping pneumatic tires and it has particular relation to apparatus in which pneumatic tires are shaped by fluid pressure, acting against the tire walls.

One object of my invention is to provide an apparatus that will both shape so-called "flat built" tire bands and insert airbags therein in a single cycle of operation.

Another object of my invention is to provide a novel mechanism for shaping a tire band.

The invention constitutes an improvement over that disclosed in my copending application Serial No. 219,892, filed September 16, 1927.

One method of manufacturing pneumatic tires consists in fabricating the tire in the form of a cylindrical or "flat built" band, subsequently expanding the tread portion into the toroidal form requisite to pneumatic tires, then inserting an expansible airbag therein and subsequently vulcanizing the tire in a mold.

Various types of apparatus have heretofore been employed for performing the shaping operation. These types of apparatus, however, were only adapted to expand the tire, the insertion of the airbag being accomplished in a subsequent step, thereby necessitating an excessive amount of manual labor.

In a machine constructed in accordance with the provisions of my invention, mechanism is provided for inserting a collapsed airbag into the tire while it is still in the shaping machine and it is there allowed to expand into its proper position due to its natural resiliency, thereby obviating the above-mentioned disadvantages.

For a better understanding of my invention, reference may now be had to the accompanying drawings, forming a part of this specification, of which;

Fig. 1 is a fragmentary view, partially in elevation and partially in cross-section, of a machine embodying my invention; and Fig. 2 is a fragmentary side-elevational view on a larger scale showing the mechanism for holding an airbag collapsed.

In practising my invention, I provide a supporting frame-work comprising upright frame members 5, 6 and 7, joined together by means of connection bars 8. The support 5 consists of upwardly converging upright members 9 and 10, secured directly together at their upper ends and connected at their lower ends by a cross bar 11. A platform 15 is secured to members 9 and 10 intermediately of their ends, and a horizontally disposed cylinder 16 having cylinder heads 17 and 18 is mounted thereon. Compression fluid conduits 20 and 21 lead from the ends of the cylinder and are connected to a multi-passage valve 22 that controls the flow of fluid under pressure from a main 23.

A piston rod 24 secured to a piston head 25 slidably mounted in the cylinder 16 extends outwardly through the cylinder head 21 and is provided at its outer end with an airbag engaging head 26, that is positioned when extended within an open ended airbag guiding cylinder 27 placed in coaxial alignment therewith upon the support 6. Both the outer periphery of the head 26 and the inner periphery of the cylinder 27 are machined to provide a compression fluid-tight fit therebetween. The forward end of the cylinder is flared to provide a seat 28 for the outer periphery of a bead of a flat built tire casing 29.

A movable head 35, positioned in coaxial alignment with the cylinder 27, has a bead engaging portion 36 corresponding to the member 26. The head is also provided with an escape valve 38 and a flexible inlet conduit 39 which is provided with a valve 40 and is connected to a compression fluid main 41.

The head 35 is supported at one end of a piston rod 42 attached at its other end to a piston head 43 slidably mounted in a compression cylinder 44 mounted upon the support 7. The ends of the cylinder are closed by cylinder heads 45 and 46, the former of which is provided with a stuffing box 47 for the piston rod 42. Compression fluid conduits 48 connect the ends of the cylinder to the fluid main 41 and the flow of fluid thereto is controlled by the multi-passage valve 49.

The upper ends of the members 9 and 10 support a relatively long cylinder 50 of comparatively small diameter, that is attached thereto in vertical alignment with the space between cylinder 27 and the head 26 by means of collars 51, and whose ends are closed by cylinder heads 54 and 55 and which communicate with the valve 22 by means of conduits 56 and 57, respectively.

A piston head 58 slidably mounted within the cylinder is provided with a piston rod 59 extending downwardly through the lower cylinder head 55 and having an angularly disposed airbag collapsing foot portion 60 upon its lower end that engages an airbag 61 positioned between the head 26 and the end of the cylinder 27 preparatory to being collapsed.

Ring segments 62 that enclose the airbag 61 when the latter is collapsed are hinged together by means of a pin 63 having one end secured in an opening in the support 6 and the other end secured in an opening formed in a bar 64 secured between the members 10. The segments when closed do not quite meet at their free ends, thereby providing an opening 65 through which the foot 60 may be retracted.

The rings are provided with outwardly projecting lugs 66, pivotally attached to curved toggle links 67, which are pivoted at their point of union 68 to a vertical piston rod 69, extending through the head 70 of a cylinder 71 and actuated by a piston head 72 within the cylinder. Fluid under pressure is admitted selectively to either end of the cylinder by means of conduits 73 and 74 having a common valve 75 controlled by a treadle 76 and communicating with a fluid main 77.

In operating the machine embodying my invention, the airbag engaging head 26 and the movable head 35 are retracted from the ends of the cylinder 27. The piston head 58 is also retracted to its extreme upper position within the cylinder 50 so that the airbag engaging foot 60 is positioned above an airbag 61 that is placed between the opening ring segments 62 and in alignment with the cylinder 27. The tire casing 29, in the form of a cylindrical band, is next positioned between the flanges 28 and 36 of the cylinder 27 and the movable head 35.

By actuating the piston head 58 downwardly the airbag is collapsed to the position indicated in Fig. 2. At the same time, the piston head 72 is actuated upwardly to cause the toggle links 67 to close the ring segments, thereby enclosing the airbag. The foot 60 is then retracted through the opening 65 between the ring segments, thereby leaving the airbag in collapsed position and in alignment with the cylinder 27. The airbag is thrust forward by actuating the airbag engaging head 26 and is positioned adjacent the tire bead that is positioned upon the cylinder. A fluid-tight chamber is formed by the head 26, the tire casing 29, and the movable head or disc 35. Fluid under pressure is admitted to the chamber thus formed by opening the valve 40 in the line 39, thereby expanding the tread portion of the tire and at the same time, the head 35 is actuated forwardly by admitting fluid under pressure to the rear end of the cylinder 46. During the expansion of the tire the bead portions thereof are moved together to the position indicated by dotted lines in Fig. 1. The airbag is then thrust forward to a position between the tire beads and is there allowed to expand and assume a position within the tire casing.

From the foregoing description, it will be apparent that I have provided a mechanism whereby airbags may be collapsed and positioned within a tire casing entirely by mechanical means, thus obviating a great deal of arduous labor upon the part of the operator.

Although I have illustrated but one form which my invention may assume and described in detail but a single application thereof it will be apparent to those skilled in the art that the invention is not so limited, but that various minor modifications may be made therein without departing from the spirit of the invention or the scope of the appended claims.

What I claim is:

1. A combined airbag inserting and tire shaping machine comprising means for engaging the outer peripheries of the beads of a "flat built" tire casing, means for moving an airbag from a position without to a position within the casing and means for pneumatically shaping the casing.

2. A combined airbag inserting and tire casing shaping machine comprising means for engaging the outer peripheries of the beads of a "flat built" tire casing, means for collapsing an airbag, means for moving the collapsed bag from a position without to a position within the inner periphery of the tire casing, and means for pneumatically shaping the tread portion of the tire.

3. A combined airbag inserting and tire shaping machine comprising a movable head having means for engaging the outer periphery of one bead of a "flat built" casing, a cylinder having means adapted for engaging the outer periphery of the other bead positioned adjacent the movable head, means for relatively moving the head and cylinder axially of each other, a piston slidably mounted within the cylinder to move a collapsed airbag to a position within the inner periphery of the casing and means to shape the tread portion of the casing before the airbag has been positioned therein.

4. A combined airbag inserting and tire shaping machine comprising a movable head having flanges adapted to engage the outer periphery of one bead of a "flat built" casing, a cylinder positioned in axial alignment with the head and having a bead engaging flange disposed upon the outer periphery thereof for engaging the outer periphery of the other bead of the tire, a piston movable within the cylinder, pneumatic means for collapsing airbags before they are advanced by the piston, means for reciprocating the piston whereby to advance a bag to a position within the inner periphery of the casing and means to shape the tread portion of the casing.

5. A combined airbag inserting and tire shaping machine comprising a movable head having flanges for engaging the outer periphery of one bead of a "flat built" tire casing, a cylinder having flanges for engaging the outer periphery of the other bead of the casing, means for admitting compressed fluid into the cylinder, and means for advancing a collapsed airbag within the inner periphery of the casing.

6. A combined airbag inserting and tire shaping machine comprising a movable head having flanges for engaging the outer periphery of one bead of a "flat built" pneumatic tire casing, pneumatic means for moving the head, a cylinder having flanges for engaging the outer periphery of the other bead of the casing, means for admitting compressed air into the cylinder, means for advancing a collapsed airbag to a position within the inner periphery of the casing, means for collapsing the airbag for insertion within the cylinder, and means for shaping the tire casing.

7. A device for successively inserting airbags within a "flat-built" pneumatic tire casing and for expanding the tread portion thereof comprising a movable head having flanges for engaging the outer periphery of one bead of a "flat built" pneumatic casing, a cylinder positioned in axial alignment with the head and having flanges for engaging the outer periphery of the other bead of the casing, a piston reciprocable in the cylinder and movable beyond the end of the latter to permit the airbag to be inserted within the cylinder, means for operating the piston and means for shaping the tire casing.

8. A device for successively inserting an airbag into a pneumatic tire casing and expanding the tread portion of the latter comprising a cylinder having a piston therein, a piston rod secured to the piston and extending outwardly from the cylinder, a movable head secured to the piston rod having flanges for engaging the outer periphery of one bead of a "flat built" casing, a second cylinder having both of its ends open positioned in axial alignment with the movable head, a piston head operable within the cylinder and removable therefrom to permit the insertion of airbags within the cylinder, means for collapsing the bag before it is inserted in the cylinder and means for moving the piston.

9. A device for inserting airbags into a pneumatic tire casing and for expanding the tread portion of the latter comprising a cylinder having a flange for engaging the outer periphery of a bead of a "flat built" casing, an airbag collapsing mechanism positioned adjacent the rear end of the cylinder, means for advancing a collapsed airbag from the collapsing mechanism to position within the inner periphery of the tire and means for shaping the tread portion of the tire.

10. A machine for inserting airbags into flat-built pneumatic tire casings and for shaping the tread portion thereof comprising means for engaging the outer peripheries of the beads of "flat built" tire bands, means for advancing an airbag from a position without to a position within the inner periphery of the casing and means for shaping the tread portion thereof.

11. A machine for inserting airbags into a pneumatic tire casing and for expanding the tread portion thereof comprising a cylinder provided with a seat at one end for engaging the outer periphery of one bead of a "flat built" casing, means for engaging the outer periphery of the other bead of the casing, an airbag collapsing mechanism positioned at the other end of the cylinder, means associated with the collapsing mechanism adapted to maintain the bag in collapsed position until it can be moved within the cylinder and means for moving the bag from the latter mechanism through the cylinder and into substantially co-planar alignment with the beads of the tire mounted upon the end of the cylinder and means to shape the tread portion of the latter.

12. Mechanism for inserting an airbag into a pneumatic tire casing and expanding the tread portion thereof comprising a cylinder provided with a seat for the outer periphery of a bead of a "flat built" tire casing upon one end thereof, means for moving the other bead of the tire toward the first mentioned bead, a tire collapsing mechanism positioned at the other end of the cylinder, ring segments hinged together for receiving an uncollapsed airbag, means to move the segments together to enclose the airbag when collapsed, means to move the collapsed airbag from the segments through the cylinder and into a position between the tire beads, and means to shape the tread portion of the latter.

In witness whereof, I have hereunto signed my name.

Signed at Akron, in the county of Summit, and State of Ohio, this 14th day of December, 1927.

ROBERT W. SNYDER.